(12) United States Patent
Doerr

(10) Patent No.: US 6,941,045 B2
(45) Date of Patent: Sep. 6, 2005

(54) TUNABLE DISPERSION COMPENSATOR

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/664,340

(22) Filed: Sep. 17, 2003

(65) Prior Publication Data

US 2005/0058397 A1 Mar. 17, 2005

(51) Int. Cl.$^7$ .......................... G02B 6/26; H04B 10/12
(52) U.S. Cl. ...................................... 385/39; 398/147
(58) Field of Search .............................. 385/39, 15, 40

(56) References Cited

U.S. PATENT DOCUMENTS

| | | | |
|---|---|---|---|
| 6,785,446 B1 * | 8/2004 | Chandrasekhar et al. | 385/39 |
| 6,842,547 B2 * | 1/2005 | Bülow | 385/14 |
| 6,853,756 B2 * | 2/2005 | Gerlach et al. | 385/1 |
| 2003/0053167 A1 * | 3/2003 | Xu | 359/124 |
| 2003/0053174 A1 | 3/2003 | Rosenfeldt | 359/161 |

FOREIGN PATENT DOCUMENTS

EP      1 176 439 A1      1/2002

OTHER PUBLICATIONS

Doerr C. R. et al. "Potentially inexpensive 10–Gb/s tunable dispersion compensator with low polarization sensitivity" IEEE Photonics Tech. Letters, vol. 16, No. 5, May 5, 2004, pp. 1340–1342.

Koichi Takiguchi, Kaname Jinguji, Katsunari Okamoto,and Yasuji Ohmorik, "Variable group–delay dispersion equalizer using lattice–form programmable optical filter on planar lightwave circuit," IEEE J. Sel. Topics in Quant. Electron., vol. 2., pp. 270–276, 1996.

Suzuki, T. Takiguchi, and T. Shibata, "Low–loss integrated–optic dynamic chromatic dispersion compensators using lattice–form planar lightwave circuits," in Optical Fiber Communication Conf. Digest, pp. 176–177, 2003.

M. Bohn, F. Horst, B.J. Offrein, G.L. Bona, E. Meissner, and W. Rosenkranz "Tunable dispersion compensation in a 40 Gb/s system using a compact FIR lattice filter in SiON technology," European Conference on Optical Communication, paper 4.2.3, 2002.

T. Ozeki, "Optical equalizers," Opt. Lett., vol. 17, pp. 375–377, Mar. 1992.

K. Tagiguchi et al, "Method for adjusting lattice–form optical devices and its use in realizeing low–loss variable chromatic dispersion compensator," Elect. Letters 20, Feb. 2003, vol. 39, No. 4, pp. 356–357.

* cited by examiner

*Primary Examiner*—Frank G. Font
*Assistant Examiner*—Charlie Peng

(57) ABSTRACT

A method and apparatus for implementing a new type of colorless Mach-Zehnder-interferometer (MZI)-based tunable dispersion compensator (TDC) that has only three MZI stages (two in a reflective version) and two adjustable couplers which are responsive to one control voltage, making it compact, low power, and simple to fabricate, test, and operate.

9 Claims, 4 Drawing Sheets

TUNABLE DISPERSION COMPENSATOR

TECHNICAL FIELD OF THE INVENTION

This invention relates generally to optical dispersion compensators and, more particularly, to a method and apparatus for implementing a colorless Mach-Zehnder-interferometer-based tunable dispersion compensator.

BACKGROUND OF THE INVENTION

Optical signal dispersion compensators can correct for chromatic dispersion in optical fiber and are especially useful for bit rates 10 Gb/s and higher. Furthermore, it is advantageous for the dispersion compensator to have an adjustable amount of dispersion, facilitating system installation. It is also advantageous if the tunable dispersion compensator (TDC) is colorless, i.e., one device can compensate many channels simultaneously or be selectable to compensate any channel in the system.

Previously proposed colorless TDCs include ring resonators[1], the virtually imaged phased array (VIPA)[2], cascaded Mach-Zehnder interferometers (MZIs)[3,4,5], temperature-tuned etalons[6], waveguide grating routers (WGRs) with thermal lenses[7], and bulk gratings with deformable mirrors[0]. The bracketed references[1] refer to publications listed in the attached Reference list. The cascaded MZI approach is particularly promising since it exhibits low loss, can be made with standard silica waveguides, and can be compact. However, previous MZI-based TDCs required 8 stages and 17 control voltages in one case[3] and 6 stages with 13 control voltages in two others[4, 5]. This large number of stages and control voltages is expensive and power-consuming to fabricate and operate, especially when compensating 10 Gb/s signals. Because fabrication accuracy cannot guarantee the relative phases of such long path-length differences, every stage of every device must be individually characterized. Also, a large number of stages often results in a high optical loss and a large form factor. Additionally, the more the stages, the more difficult it is to achieve polarization independence.

What is desired is a simplified MZI-based TDCs having reduced number of stages and control voltages.

SUMMARY OF THE INVENTION

In accordance with the present invention, I disclose a method and apparatus for implementing a new type of colorless Mach-Zehnder-interferometer (MZI)-based tunable dispersion compensator (TDC) that has only three MZI stages (two in a reflective version) and two adjustable couplers which are responsive to one control voltage, making it compact, low power, and simple to fabricate, test, and operate. Such an MZI-based TDC with a 25-GHz-free-spectral-range version can compensate ~±2100 ps/nm for 10 Gb/s signals. Having a free-spectral range equal to the system channel spacing divided by an integer makes it possible for the TDC to compensate many channels simultaneously.

More particularly, one embodiment of my tunable chromatic optical signal dispersion compensator comprises three cascaded Mach-Zehnder interferometers, MZIs, a first MZI including a fixed 50/50 coupler for receiving an input optical signal, a second MZI including a first adjustable coupler that is shared with the first MZI and a second adjustable coupler that is shared a third MZI, and the third MZI including a fixed 50/50 coupler for outputting a dispersion-adjusted output optical signal, wherein the path-length difference between the two arms in the second MZI is twice that of the first MZI, and the path-length difference between the two arms in the first MZI is equal to that of the third MZI and wherein said first and second shared adjustable couplers are adjusted with equal coupling ratios using a single control signal to provide adjustable dispersion compensation to the output signal.

In a reflective embodiment, my tunable chromatic optical signal dispersion compensator comprises a first MZI including a fixed 50/50 coupler for receiving an input optical signal at a first port and an adjustable coupler, that is shared with a second reflective MZI, the path-length difference between the two arms in the second MZI is equal to that of the first MZI and wherein the adjustable coupler is responsive to a control signal for controlling the amount of signal dispersion added by said compensator to the input optical signal to form the output optical signal.

BRIEF DESCRIPTION OF THE DRAWINGS

The present invention will be more fully appreciated by consideration of the following Detailed Description, which should be read in light of the accompanying drawing in which.

In the following description, identical element designations in different figures represent identical elements. Additionally in the element designations, the first digit refers to the figure in which that element is first located (e.g., 101 is first located in FIG. 1).

DETAILED DESCRIPTION

Figure 1:
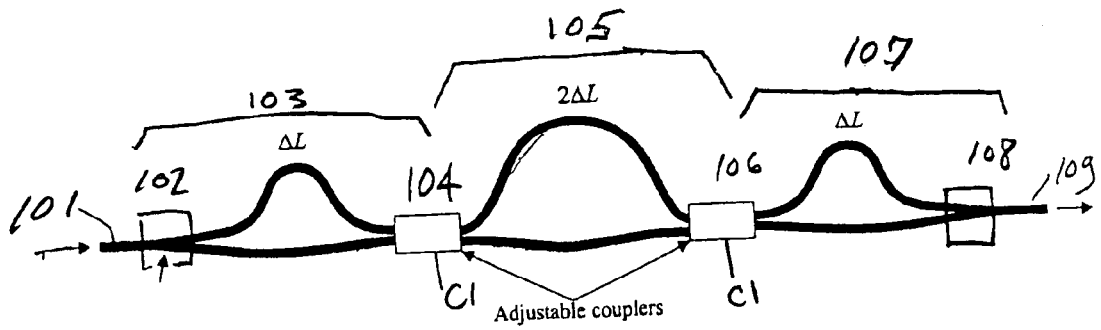
FIG. 1 illustrates, in accordance with the present invention, a tunable dispersion compensator (TDC) that has only three stages and one control voltage.

With reference to FIG. 1 there is shown, in accordance with the present invention, an illustrative diagram of my tunable dispersion compensator (TDC) that has only three stages and uses one control voltage. The three stages 103, 105, and 107 are implemented using Mach-Zehnder-interferometers (MZIs). The first and second MZIs 103, 105 share an adjustable coupler 104 and the second and third MZIs 105, 107 share an adjustable coupler 106. The two adjustable couplers 104, 106 are always set equally. The first and third MZI have path-length differences ΔL, and the center MZI has a path-length difference of 2ΔL (plus any phase offset from the couplers).

The TDC operates as follows. An input optical signal at port 101 is split equally to the two arms of the first MZI 103 by the y-branch coupler 102. In the first MZI 103, one arm is longer, by ΔL, than the other arm so that when the optical signals are recombined in the first adjustable coupler 104, the amount of light sent to each of the two arms of the second MZI 105 depends on the wavelength. The first adjustable coupler 104 in response to a control signal C1 controls the sign and amount of dispersion introduced to the signals outputted from the coupler 104 to the arms of the second MZI 105. Similarly, the second adjustable coupler 106 in response to a control signal C1 controls the sign and amount of dispersion introduced to the signals received from the arms of the second MZI 105 and outputted from the coupler 106 to the arms of the third MZI 107. If positive dispersion is desired, a predetermined control signal C1 to adjustable couplers 104, 106 is used to enable the longer wavelengths to predominantly travel the longer arms of the second MZI 105 and third MZI 107, respectively. The third MZI 107 then performs a function similar to the first MZI in that the wavelengths on its arms are recombined in the final y-branch coupler 108 and are sent to the output port 109.

Note that when the TDC device is set for zero dispersion, the two adjustable couplers 104, 106 are 100/0 (i.e., the couplers perform a simple cross-connect function—an input to the upper left-hand port of the adjustable coupler goes to the lower right-hand output port of the adjustable coupler and vice versa). In such a zero-dispersion case, the optical signals through the TDC traverse equal path lengths. While only the differential arm lengths are shown in FIG. 1, in MZIs 103 and 107, the actual arm lengths are L+ΔL and L and in MZI the actual arm lengths are L+2ΔL and L. Thus, the signal path from one output port of y-branch coupler 102 to the output port 109 of y-branch coupler 108 follows a path of length L+ΔL through MZI 103, L through MZI 105, and L+ΔL through MZI 107, giving a total length of 3L+2ΔL; and the other path consists of L, L+2ΔL, and L, also giving a total length of 3L+2ΔL. Thus for the zero dispersion setting, the TDC device acts simply as a waveguide of length 3L+2ΔL and so introduces no significant chromatic dispersion.

In the above description ΔL determines the free spectral range (FSR) of the TDC. The FSR is equal to $FSR = C_0 / \Delta L \cdot n_g$ Where $C_0$ is 300 km/s (vacuum speed of light)

$n_g$ is the group refractive index of the MZI waveguides.

In one illustrative design, for an optical signal data rate of 10 Gb/s, the FSR would be about 25-GHz. Such an MZI-based TDC with a 25-GHz-free-spectral-range version can compensate ~±2100 ps/nm for 10 Gb/s signals. In a multi-wavelength channel system, having a FSR equal to the system wavelength channel spacing divided by an integer makes it possible for the TDC to compensate many channels simultaneously. Thus, my TDC is colorless, i.e., it can compensate many channels simultaneously or be selectable to compensate any channel in a multi-wavelength channel system In a well-known manner, MZIs 103, 105, 107 may be implemented together as a planar optical integrated circuit or may be implemented using discrete optical elements mounted on a substrate.

The dispersion of TDC can be tuned positive or negative by adjusting couplers 104 and 106 toward 50/50 using a control signal C1. As will be discussed with reference to FIG. 3, by selecting a control signal C1 that is higher or lower that the zero dispersion control signal C1 setting, TDC can be set to a positive or negative dispersion level. The design is similar to the birefringent crystal design of Ref. [9], except that the device of [9] was not tunable, using only a fixed 50/50 coupling ratio. Advantageously, my TDC design is colorless, i.e., it can compensate many channels simultaneously or be selectable to compensate any channel in the system.

Note that while the adjustable couplers 104 and 106 are controlled by a common control signal C1, if desirable separate control signals may be used. Separate controls could be useful, for example, if the couplers have unequal characteristics due to fabrication non-uniformities.

Figure 2:
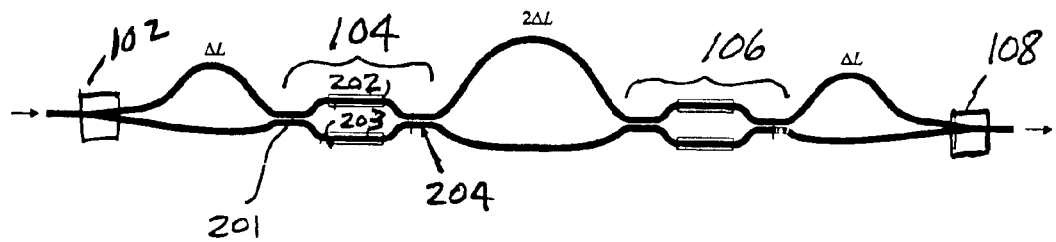
FIG. 2 illustrates the TDC of FIG. 1 where the adjustable couplers are each implemented using an MZI-based adjustable coupler.

FIG. 2 illustrates, in accordance with the present invention, a TDC of FIG. 1 where the adjustable couplers 104 and 106 are implemented using two MZI-based adjustable couplers. As shown, the adjustable couplers 104, 106 are implemented using small MZIs with controllable phase shifters. Each MZI includes a 50/50 fixed evanescent coupler 201, upper phase shifter 202, lower phase shifter 203, and 50/50 fixed evanescent coupler 204. Driving both the lower phase shifters 203 of both MZIs with the same control signal C1 at a first level pushes the dispersion in one direction, and driving both upper phase shifters 202 at a second level pushes the dispersion in the other direction. Depending on the orientations of the main MZIs, there may be a small path-length difference between the two arms in the adjustable coupler MZI.

Figure 3:
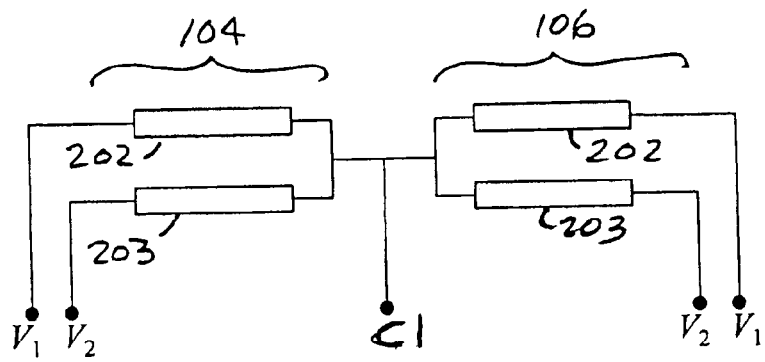
FIG. 3 illustrates the electrical layout for using a single control signal, C1, to control the two MZI-based adjustable couplers of FIG. 2.

If the phase shifters 202, 203 are thermooptic heaters, then a convenient electrical layout that requires only one control signal C1 is shown in FIG. 3. The control signal C1 voltage is varied between the levels V1 and V2, where V2 is greater than V1. When control voltage C1 is at a predetermined zero dispersion level Vz between V1 and V2, then the same current flows through both the upper and lower phase shifters establishing zero dispersion and, hence, adjustable couplers 202, 203 perform a simple cross-connect function as discussed previously. When control signal C1 is at level V1 then no current flows through the upper phase shifters 202 and current flows through the lower phase shifters 203 establishing the maximum amount of a dispersion of a first polarity. When the desired dispersion level is somewhere between zero dispersion level Vz and the maximum first polarity dispersion level V1, then control signal C1 is suitably adjusted to a voltage level between V1 and Vz. At control signal C1 levels between V1 and Vz, the upper 202 and lower 203 phase shifters are operated in a push-pull arrangement. That is, for example, in the upper phase shifter 202 current is increasing while in the lower phase shifter current is decreasing.

When control signal C1 is at level V2 then no current flows through the lower phase shifters 202 and current flows through the upper phase shifters 203 establishing the maximum amount of a dispersion of a second polarity. When the desired dispersion level is somewhere between zero dispersion level Vz and the maximum second polarity dispersion level V2, then control signal C1 is suitably adjusted to a voltage level between Vz and V2. This push-pull operation of the upper 202 and lower 203 phase shifters results in a low worst-case thermooptic power consumption and roughly constant power dissipation for all tuning settings[10].

Figure 4:
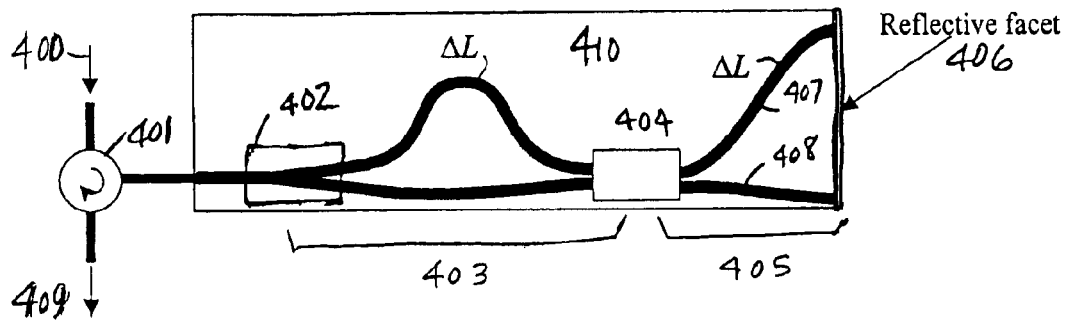
FIG. 4 illustrates, in accordance with the present invention, a reflective design of a tunable dispersion compensator (TDC) that uses only one control voltage.

With reference to FIG. 4 there is shown, in accordance with the present invention, a reflective design of a tunable dispersion compensator (TDC) that also uses only one control voltage. Since the TDC arrangement of FIG. 1 is symmetric, as shown in FIG. 4 it can be implemented using a simpler reflective design, at the expense of requiring a circulator. In the reflective design of FIG. 4, MZI 403 performs the function of the first 103 and third 107 MZIs of FIG. 1 and reflective MZI 405 performs the function of MZI 105 of FIG. 1.

An input optical signal at port 400 passes through circulator 401 and is split equally to the two arms of the MZI 403 by the y-branch coupler 412. In the MZI 403, one arm is longer, by ΔL, than the other arm so that when the optical signals are recombined in the first adjustable coupler 404, the amount of light sent to each of the two arms of the reflective MZI 405 depends on the wavelength. The adjustable coupler 404 operates in response to a control signal C1 that controls both the sign and amount of dispersion introduced to the signals outputted from the coupler 404 to the arms 407, 408 of the reflective MZI 405 and also establishes the same sign and amount of dispersion introduced to the signals outputted from the coupler 404 to the arms of MZI 403. Note that the reflective MZI 405 has a reflective facet 406 for reflecting signals received from the two arms 407 and 408 back to these arms. Since the signal traverses twice through arms 407, 408, both left-to-right and then right-to-left, the length of arm 407 is need only be ΔL longer than arm 408. The reflected signals then traverse MZI 403 in the right-to-left direction (to act like MZI 107 of FIG. 1) and are combined in y-branch coupler 402 (which acts like y-branch coupler 108 of FIG. 1). The output signal from y-branch coupler 402 then passes through circulator 401 to output port 409. Reflective TDC of FIG. 4, using control signal C1, can control the sign and amount of dispersion introduced to the signal outputted from output port 409 in the same manner that is achieved by TDC of FIG. 1.

Note that one can create an adjustable coupler by other methods than as shown in FIG. 2. For example, instead of two 50/50 evanescent couplers 201 and 204 one can use two 50/50 multi-section evanescent couplers. Multi-section evanescent couplers can give a more accurate 50/50 splitting ratio in the face of wavelength, polarization, and fabrication changes. Another possibility is to use multimode interference couplers.

Likewise, couplers 102 and 108 could be other 50/50 couplers than y-branch couplers. For instance, they could be multimode interference couplers.

Figure 5:
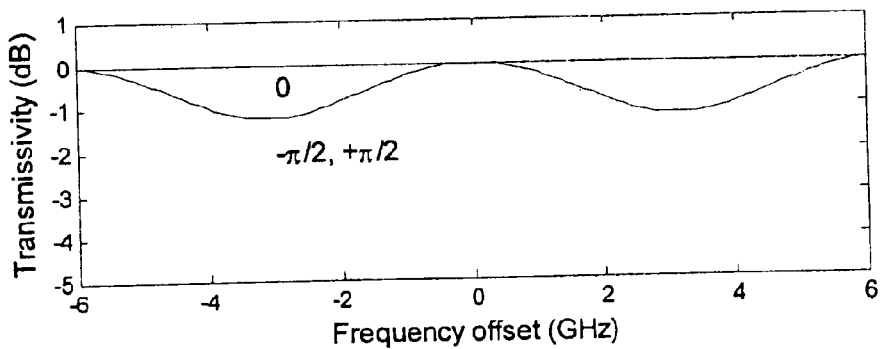
FIGS. 5A and 5B illustratively show the transmissivity and group-delay characteristics of my TDC at three different settings of the adjustable coupler(s).
Figure 5:
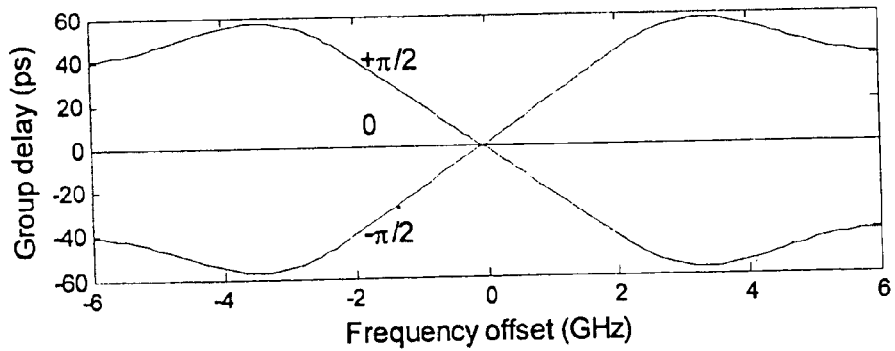
Figure 6A:
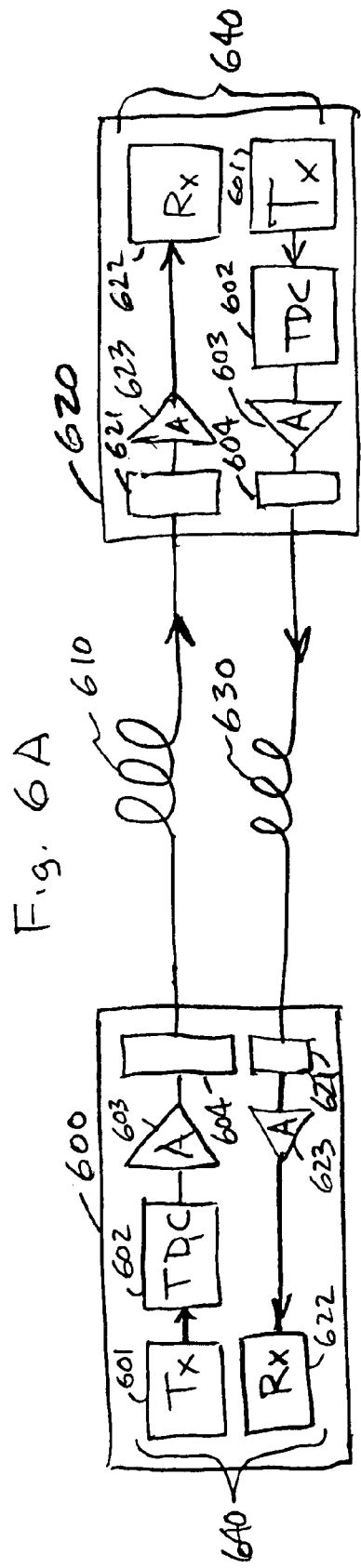
FIGS. 6A and 6B show the use of my TDC in illustrative optical transmission systems.
Figure 6B:
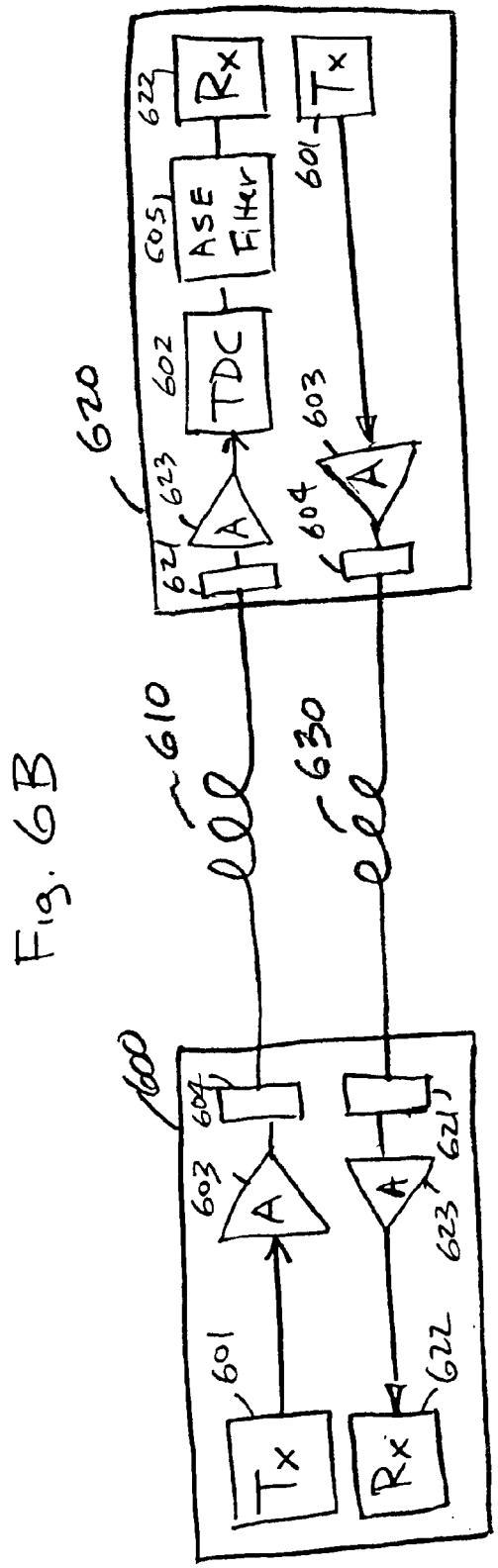

FIG. 5A shows the simulated transmissivity and FIG. 5B shows chromatic dispersion (group delay characteristic) through my TDC at three different settings (0, +π/2, −π/2) of the adjustable couplers (s) of FIGS. 1 and 4. In FIGS. 5A and 5B, the free-spectral range is 25 GHz, at the limits and center of the tuning range. The wavelength is 1550 nm. The marked phases denote the phase difference between the MZI arms in the tunable couplers of FIG. 2. The loss is theoretically zero and does not increase at the channel center as the dispersion is tuned away from zero. At maximum dispersion, there is a transmissivity ripple of 1.25 dB peak-to-peak; the dispersion reaches ±2500 ps/nm. The bandwidth is not very wide, though: the transmitter frequency error must be less than ~±2.5 GHz (±20 pm). This is achievable for wavelength-locked transmitters. Practically, for 10 Gb/s signals in this case the dispersion is limited to ~±2100 ps/nm FIGS. 6A and 6B show the use of my TDC in illustrative optical transmission systems. FIG. 6A shows a pre-transmission dispersion compensation system where the first location 600 includes an optical transmitter unit 601, a TDC 602 used for pre-transmission dispersion compensation, an optical amplifier 603, and a wavelength multiplexer 604, if needed. The output signal is sent over the optical facility 610 to a second location 620 that includes a wavelength demultiplexer 621 (if needed), an amplifier 623, and an optical receiver unit 622. Since the illustrative optical transmission systems is bi-directional, the first location also includes a demultiplexer 621 (if needed), an amplifier 623, and an optical receiver unit 622 connected over optical facility 630 to the second location 620 which includes an optical transmitter unit 601, a TDC 602 used for pre-transmission dispersion compensation, an optical amplifier 603, and a multiplexer 604 (if needed). Note that the optical transmitter unit 601 and the optical receiver unit 622 are typically packaged together as a transponder unit 640.

FIG. 6B shows a post-transmission dispersion compensation system where the first location 600 includes an optical transmitter unit 601, an optical amplifier 603, and a wavelength multiplexer 604 (if needed). The output signal is sent over the optical facility 610 to a second location 620 that includes a wavelength demultiplexer 621 (if needed), an amplifier 623, a TDC 602 for post-transmission dispersion compensation, an optical filter 605 [e.g., an amplified spontaneous emission (ASE) filter], and an optical receiver unit 622. Since the illustrative optical transmission systems is bi-directional, the first location also includes a demultiplexer 621 (if needed), an amplifier 623, a TDC 602, an optical filter 605, and an optical receiver unit 622 connected over optical facility 630 to the second location 620 which includes an optical transmitter unit 601, an optical amplifier 603, and a multiplexer 604 (if needed). The order of the TDC 602 and ASE filter 605 could be reversed without affecting system performance.

Note that for a system having a standard single mode fiber (SSMF) optical facility 610 less than about 80 Km, no dispersion compensation is typically needed. For a SSMF optical facility 610 in the range of about 80–135 Km the pre-transmission dispersion compensation system of FIG. 6A is preferable. For a SSMF optical facility 610 in the range of about 135–160 Km the pre-transmission dispersion compensation system of FIG. 6B is preferable.

In the system arrangements of FIGS. 6A and 6B, it should be noted that TDC 602 can be integrated together with one or more of the optical components, such as optical transmitter 601, optical amplifier 603, optical filter 605, wavelength multiplexer 604, wavelength demultiplexer 621, and optical receiver 622. For example, the TDC could be monolithically integrated in InGaAsP with a laser and an optical modulator to form an optical transmitter with built-in dispersion precompensation.

Figure 7A:
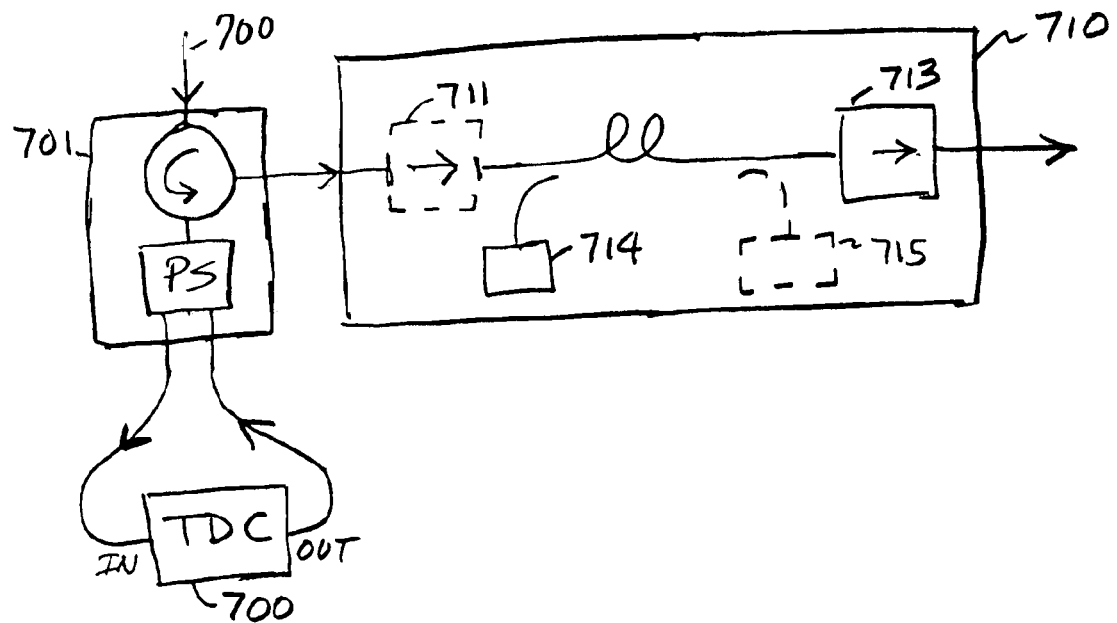
FIGS. 7a and 7B show my TDC arranged together with an Erbium amplifier.

FIG. 7A shows on illustrative design of my TDC arranged together with an Erbium amplifier. In this arrangement, the TDC 700 is arranged in a polarization diversity scheme, in order to make the TDC function polarization independent even if the TDC device itself is polarization dependent, in which polarization-maintaining fibers (PMFs) 702 and 703 are spliced to a circulator/polarization splitter (CPS) 701 of the type described in Ref. [11]. In operation, an input optical signal 700 received by the circulator is split in the polarization splitter and coupled via PMF 702 to TDC 700. The dispersion compensated optical signal from TDC 700 is coupled via PMF 703 to polarization splitter and the circulator to Erbium amplifier 710. The circulator/polarization splitter (CPS) 701 eliminates the need for an input signal isolator 711 in Erbium amplifier 710. Thus, the Erbium amplifier 710 need only include the Erbium fiber output isolator 713 and either forward pump and coupler 714 or back pump and coupler 714. It should be noted that since the TDC of FIG. 1 has only three stages, it can relatively simply be made polarization independent on its own and therefore does not need the polarization diversity scheme using PMFs 702 and 703 and circulator/polarization splitter (CPS) 701.

Figure 7B:
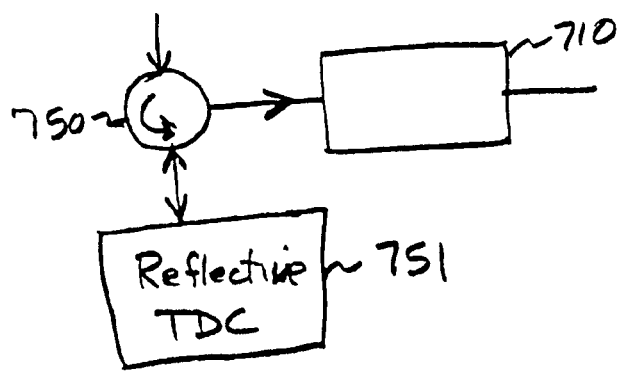

FIG. 7B shows a polarization independent reflective TDC 751 of FIG. 4 arranged together with Erbium amplifier 710. A circulator 750 is used to couple the input optical signal 700 to TDC 751 and to couple the dispersion compensated optical signal to Erbium amplifier 710.

With reference to FIG. 1, I illustratively describe the initial setup of an exemplary prototype TDC that was made and tested. The TDC was temperature controlled with a thermoelectric cooler. Because the path-length differences in MZIs 103, 105, and 107 are so large, after fabrication the relative phase in each MZI stage was random. Thus the arms are permanently trimmed using hyper-heating[12]. The procedure is as follows: with no power applied, the adjustable couplers 104, 106 are set for 100/0 (i.e., the couplers look like waveguide crossings in FIG. 1), and the transmissivity spectrum is flat. Then the left coupler 104 is adjusted to be 0/100, causing the transmissivity spectrum to have a full sinusoidal ripple. The position of a valley is marked. Then the left coupler 104 is restored to 0/100, and the right coupler 106 adjusted to 0/100. The path-length differences in the two outermost MZIs 103, 107 are correct when the ripples from the two cases are wavelength-aligned. If they are not, one of the outer MZIs' arms is hyperheated to make them aligned. Then, with both couplers 104, 106 at 100/0, the center MZI 105 arms are hyperheated in order to maximize the transmissivity. After trimming, the fiber-to-fiber loss of the TDC apparatus, including the CPS, is 4.0 dB.

Various modifications of this invention will occur to those skilled in the art. Nevertheless all deviations from the specific teachings of this specification that basically rely upon the principles and their equivalents through which the art has been advanced are properly considered within the scope of the invention as described and claimed.

REFERENCES

[1] C. K. Madsen, G. Lenz, A. J. Bruce, M. A. Cappuzzo, L. T. Gomez, and R. E. Scotti, "Integrated all-pass filters for tunable dispersion and dispersion slope compensation," IEEE Photon. Technol. Lett., vol. 11, pp. 1623–1625, December 1999.

[2] M. Shirasaki, "Chromatic dispersion compensator using virtually imaged phased array," IEEE Photon. Technol. Lett., vol. 9, pp. 1598–1600, December 1997.

[3] Koichi Takiguchi, Kaname Jinguji, Katsunari Okamoto, and Yasuji Ohmori, "Variable group-delay dispersion equalizer using lattice-form programmable optical filter on planar lightwave circuit," IEEE J. Sel. Topics in Quant. Electron., vol. 2., pp. 270–276, 1996.

[4] M. Bohn, F. Horst, B. J. Offrein, G. L. Bona, E. Meissner, and W. Rosenkranz, "Tunable dispersion compensation in a 40 Gb/s system using a compact FIR lattice filter in SiON technology," European Conference on Optical Communication, paper 4.2.3, 2002.

[5] S. Suzuki, T. Takiguchi, and T. Shibata, "Low-loss integrated-optic dynamic chromatic dispersion compensators using lattice-form planar lightwave circuits," in Optical Fiber Communication Conf. Digest, pp. 176–177, 2003.

[6] D. J. Moss, M. Lamont, S. McLaughlin, G. Randall, P. Colbourne, S. Kiran, and C. A. Hulse, "Tunable dispersion and dispersion slope compensators for 10 Gb/s using all-pass multicavity etalons," IEEE Photon. Technol. Lett., vol. 15, pp. 730–732, May 2003.

[7] C. R. Doerr, L. W. Stulz, S. Chandrasekhar, L. Buhl, and R. Pafchek, "Multichannel integrated tunable dispersion compensator employing a thermooptic lens," Optical Fiber Communication Conference, postdeadline paper FA6-1, 2002.

[8] D. Nielson, R. Ryf, D. Marom, S. Chandrasekhar, F. Pardo, V. Aksyuk, M. Simon, and D. Lopez, "Channelized dispersion compensator with flat pass bands using an array of deformable MEMS mirrors," OFC postdeadline paper PD29, 2003.

[9] T. Ozeki, "Optical equalizers," Opt. Lett., vol. 17, pp. 375–377, March 1992.

[10] C. R. Doerr, L. W. Stulz, R. Pafchek, and S. Shunk, "Compact and low-loss manner of waveguide grating router passband flattening and demonstration in a 64-channel blocker/multiplexer," IEEE Photon. Technol. Lett., vol. 14, pp. 56–58, January 2002.

[11] C. R. Doerr, K. W. Chang, L. W. Stulz, R. Pafchek, Q. Guo, L. Buhl, L. Gomez, M. Cappuzzo, and G. Bogert, "Arrayed waveguide dynamic gain equalization filter with reduced insertion loss and increased dynamic range," IEEE Photon. Technol. Lett., vol. 13., pp. 329–331, April 2001.

[12] K. Moriwaki, M. Abe, Y. Inoue, M. Okuno, and Y. Ohmori, "New silica-based 8×8 thermo-optic matrix switch on Si that requires no bias power," in Optical Fiber Conf. Digest, pp. 211–212, 1995.

I claim:

1. A tunable chromatic optical signal dispersion compensator comprising three cascaded Mach-Zehnder interferometers, MZIs, a first MZI including a fixed 50/50 coupler for receiving an input optical signal, a second MZI including a first adjustable coupler that is shared with the first MZI and a second adjustable coupler that is shared a third MZI, and the third MZI including a fixed 50/50 coupler for outputting a dispersion-adjusted output optical signal and wherein said first and second shared adjustable couplers are adjusted with equal coupling ratios using a single control signal to provide adjustable dispersion compensation to the output signal.

2. A tunable chromatic optical signal dispersion compensator comprising three cascaded Mach-Zehnder interferometers, MZIs, a first MZI including a fixed 50/50 coupler for receiving an input optical signal, a second MZI including a first adjustable coupler that is shared with the first MZI and a second adjustable coupler that is shared a third MZI, and the third MZI including a fixed 50/50 coupler for outputting a dispersion-adjusted output optical signal, wherein said first and second shared adjustable couplers are adjusted with equal coupling ratios using a single control signal to provide adjustable dispersion compensation to the output signal, and wherein the first and third MZIs have a path-length difference $\Delta L$ and the second MZI has a path-length difference $2\Delta L$.

3. The optical signal dispersion compensator of claim 1 wherein when the two adjustable couplers are set to a 100/0 coupling ratio, the optical signal dispersion compensator has zero dispersion and wherein the dispersion can be tuned positive or negative by adjusting the two adjustable couplers towards a 50/50 coupling ratio.

4. The optical signal dispersion compensator of claim 1 wherein each of the two adjustable couplers is implemented using an MZI with phase shifters.

5. The optical signal dispersion compensator of claim 4 wherein the phase shifters of each of the two adjustable couplers uses thermooptic heaters operated in a push-pull manner by the single control signal.

6. The optical signal dispersion compensator of claim 1 implemented as a planar optical integrated circuit or using discrete optical elements.

7. The optical signal dispersion compensator of claim 1 being integrated as part of an optical apparatus consisting of one or more of the following optical components an optical transmitter,
an optical amplifier,
an optical filter,
a wavelength multiplexer,
a wavelength demultiplexer,
and an optical receiver.

8. The optical signal dispersion compensator of claim 1 being used in a multi-wavelength channel system, the optical signal dispersion compensator having a free-spectral range equal to the system channel spacing divided by an integer.

9. A reflective tunable chromatic optical signal dispersion compensator comprising a first MZI including a fixed 50/50 coupler for receiving an input optical signal at a first port and an adjustable coupler, that is shared with a second reflective MZI, the path-length difference between the two arms in the second MZI is equal to that of the first MZI and wherein the adjustable coupler is responsive to a control signal for controlling the amount of signal dispersion added by said compensator to the input optical signal to form the output optical signal.

* * * * *